No. 611,976. Patented Oct. 4, 1898.
N. RATCHFORD.
NUT LOCK.
(Application filed Dec. 30, 1897.)

(No Model.)

WITNESSES:
H. B. Bradshaw
J. Y. Fravel

INVENTOR
Nicholas Ratchford
BY
C. C. Shepherd
ATTORNEY

UNITED STATES PATENT OFFICE.

NICHOLAS RATCHFORD, OF GREENVILLE, OHIO.

NUT-LOCK.

SPECIFICATION forming part of Letters Patent No. 611,976, dated October 4, 1898.

Application filed December 30, 1897. Serial No. 664,596. (No model.)

*To all whom it may concern:*

Be it known that I, NICHOLAS RATCHFORD, a citizen of the United States, residing at Greenville, in the county of Darke and State of Ohio, have invented a certain new and useful Improvement in Nut-Locks, of which the following is a specification.

My invention relates to the improvement of nut-locks of that class which are adapted to prevent a reversed rotation of the bolt-nuts; and the objects of my invention are to provide a nut-locking clip and bolt of peculiar construction and arrangement of parts, whereby improved means are provided for producing a positive guard against the rotation of a nut on said bolt in either direction and to produce said device in such form as to admit of its production at a low cost of manufacture and of its being readily adapted for use. These objects I accomplish in the manner illustrated in the accompanying drawings, in which—

Figure 1:
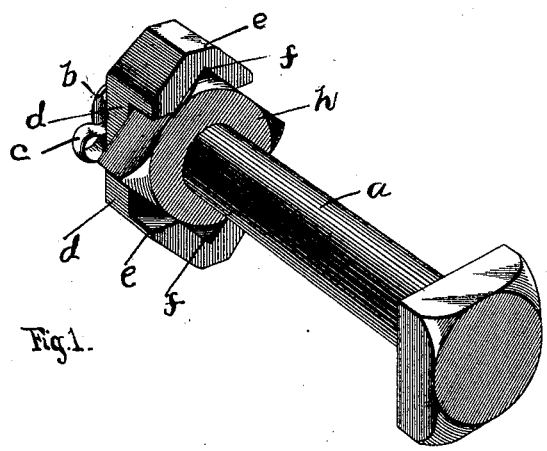
Figure 2:
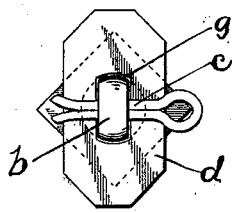
Figure 3:
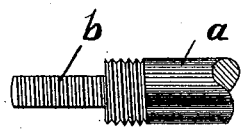

Figure 1 is a view in perspective of a bolt and nut, showing my improved locking device applied thereto. Fig. 2 is an end view thereof, and Fig. 3 is a view in elevation of the outer end of the bolt which I employ.

Similar letters refer to similar parts throughout the several views.

In carrying out my invention I flatten opposite sides of the outer or threaded end portion of the bolt $a$, as indicated at $b$, this flattened end portion being provided with a transverse opening to admit of the insertion therethrough of a cotter-pin $c$.

$d$ represents the locking-clip, which, as shown in the drawings, is in the form of an oblong bar or block the opposite ends of which are formed with projecting lugs $e$, the latter having formed on their inner sides angular recesses, (indicated at $f$.) The body or back of the clip is formed with an opening therethrough, such as is indicated at $g$, the latter being of such form as to receive the flattened end of the bolt, which is adapted to be inserted therethrough in the manner shown. The nut $h$ being screwed onto the bolt in the usual manner and the back of the clip $d$ having the flattened bolt termination inserted through its opening $g$, it is obvious that the angular recesses of the clip-lugs $e$ may be made to embrace, as shown, opposite angles or corners of the nut $h$. This being accomplished, a possibility of the clip slipping off the bolt is prevented by the insertion of the cotter-pin $c$ through the opening in the end of the bolt termination $b$. Attention is called to the fact that the lower side of the upper lug $e$ and the upper side of the lower lug $e$ on the outer sides of the recesses $f$ are formed on horizontal lines, so that, if desired, the lugs may be made to embrace or bear against opposite straight sides of the nut instead of embracing the corners, in the manner shown in the drawings. By either operation it is obvious that the lugs will serve to prevent any possibility of a rotation of the nut in either direction, and therefore prevent any possibility of the nut working off the bolt. It will also be seen that by engaging the clip either with the nut sides or corners the number of locking-points correspond with the number of such corner and sides. Owing to the flattening of the bolt termination and the corresponding form of the opening in the locking-clip it will be seen that said clip will be prevented at all times from rotation. It will also be observed that a nut-lock such as that herein described may be produced at an exceedingly low cost of manufacture and that the same may be readily adapted for use.

Having now fully described my invention, what I claim, and desire to secure by Letters Patent, is—

In a nut-lock, the combination with a bolt and nut thereon, said bolt having a flattened outer end portion provided with oppositely-located threaded portions and a pin-opening therethrough, of a locking-clip consisting of a bar or block having corresponding upper and lower projecting lugs, the latter being provided with inner side angular recesses, said upper and lower lugs having their lower and upper sides respectively flattened or extending in a direction at right angles with the direction of the length of the clip to admit of said lugs engaging with opposite sides or corners of the nut, substantially as and for the purpose specified.

NICHOLAS RATCHFORD.

In presence of—
C. C. SHEPHERD,
A. L. PHELPS.